Dec. 23, 1969  P. B. MISCHEL ET AL  3,485,580
METHOD OF PRODUCING GRANULAR DIAMMONIUM PHOSPHATE
Filed May 12, 1967
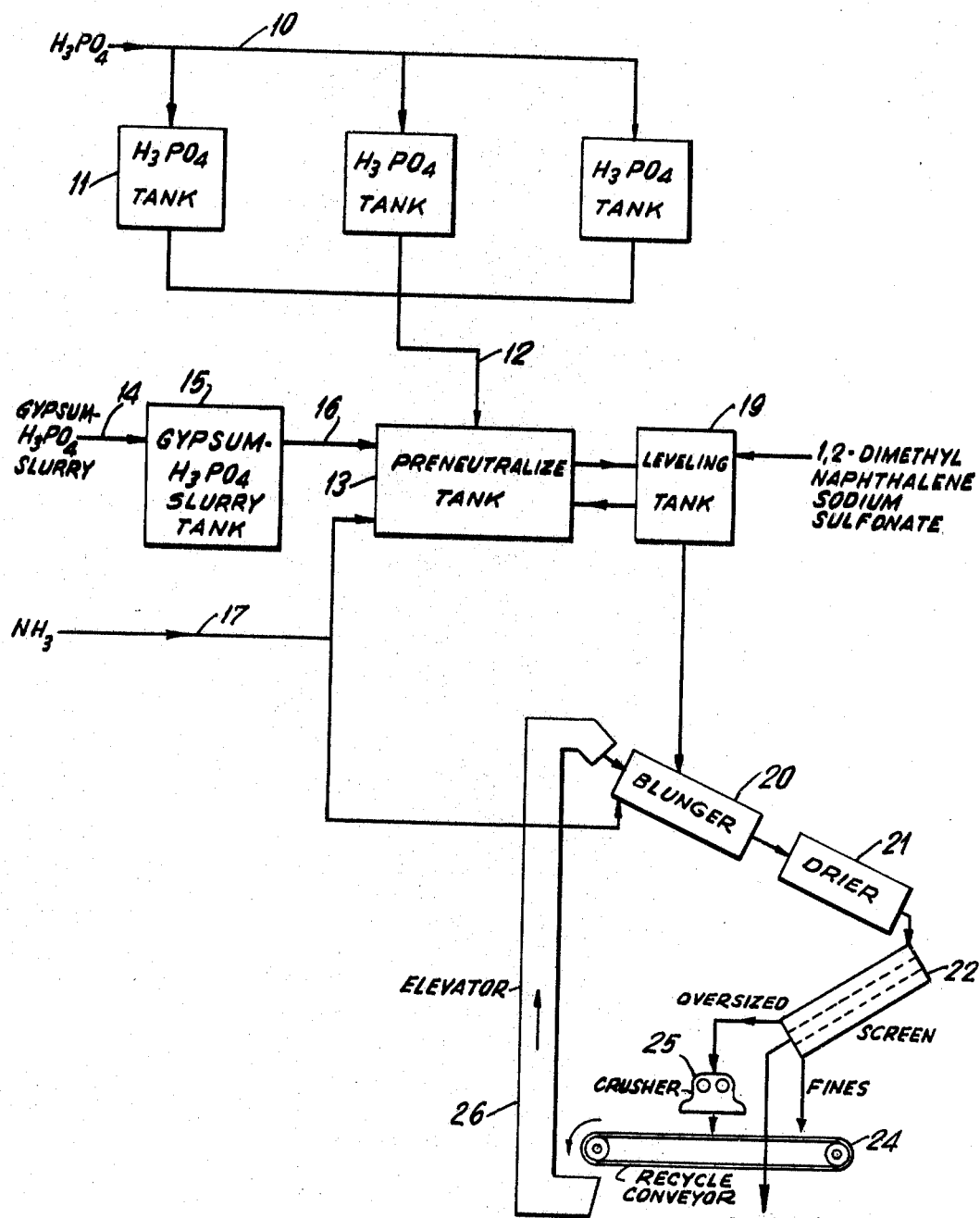
INVENTORS.
PHILIP B. MISCHEL
JOHN W. PATRICK
BY
ATTORNEYS.

United States Patent Office 3,485,580
Patented Dec. 23, 1969

3,485,580
METHOD OF PRODUCING GRANULAR DIAMMONIUM PHOSPHATE
Philip B. Mischel, Greenlawn, N.Y., and John W. Patrick, Winter Park, Fla., assignors to Petrochemicals Company, Inc., Fort Worth, Tex., a corporation of Delaware
Filed May 12, 1967, Ser. No. 638,041
Int. Cl. C01b 25/28
U.S. Cl. 23—107          3 Claims

ABSTRACT OF THE DISCLOSURE

The known methods of producing granulated diammonium phosphate by simultaneously ammoniating phosphoric acid and granulating the diammonium phosphate thereby produced are modified by introducing an alkylaryl sulfonic acid or an alkali metal salt of an alkylaryl sulfonic acid into the reaction mixture of ammonia and phosphoric acid. The diammonium phosphate resulting from this modified process has substantially less tendency to cake than conventionally produced diammonium phosphate.

---

This invention relates to the production of granulated diammonium phosphate.

Granulated diammonium phosphate is widely used as a fertilizer alone and in mixture with other fertilizer components because it is a rich source of nitrogen and phosphorous. A serious problem, however, to producers and consumers of granulated diammonium phosphate is that it conglomerates when stored, which phenomenon is commonly referred to as caking.

Granulated diammonium phosphate is commonly produced by ammoniating phosphoric acid and, simultaneously, granulating the diammonium phosphate thereby produced. According to the present invention, it is found that if there is introduced into the reaction mixture of ammonia and phosphoric acid a quantity of an alkylaryl sulfonic acid or an alkali metal salt of an alkylaryl sulfonic acid, such that the diammonium phosphate produced contains between about 0.005 and 0.3 percent by weight of the alkali metal salt or ammonium salt of the alkylaryl sulfonic acid, the granulated diammonium phosphate produced has substantially less tendency to cake. Moreover, this anti-caking effect persists even if the granular diammonium phosphate is not bagged until a month or even longer after production and even after the granular diammonium phosphate has been stored in bags for several months or even longer.

An alkylaryl sulfonic acid introduced into the reaction mixture reacts with the ammonia to form the ammonium salt of the alkylaryl sulfonic acid. Accordingly, introducing an alkylaryl sulfonic acid into the reaction mixture is tantamount to introducing the ammonium salt thereof. Similarly, one may form an alkali metal salt of the alkylaryl sulfonic acid in situ in the reaction mixture by adding to the reaction mixture an alkali metal base such as an alkali metal hydroxide.

In the method of the invention, there is no essential modification of the conventional methods of producing granulated diammonium phosphate by simultaneously ammoniating phosphoric acid and granulating the phosphoric acid thereby produced other than the introduction into the diammonium phosphate produced, by way of the reaction mixture, of at least about 0.005 percent, by weight, based on the weight of the diammonium phosphate produced, of the alkali metal salt or the ammonium salt of the alkylaryl sulfonic acid. Alkylaryl sulfonic acids and salts thereof are very economically produced by the methods described in U.S. Patent No. 2,773,896 and U.S. patent application Ser. No. 608,718 filed Dec. 19, 1966, assigned to the assignee of the present application. Generally, no more than about 0.05 percent, by weight, based on the weight of the diammonium phosphate produced, of the alkali metal salt or ammonium salt of the alkylaryl sulfonic acid is necessary to produce a substantial anti-caking effect. In fact, minimum amounts not infrequently give the best results. The use of larger amounts frequently does not result in greater anti-caking and, in fact, a decrease in anti-caking may be observed. Amounts greater than about 0.3 percent do not result in anti-caking and, in fact, these excessive amounts frequently will cause greater than normal caking. However, within these prescribed limits, the anti-caking obtained by the use of the alkali metal salt or ammonium salt of the alkylaryl sulfonic acid is excellent both in degree and in permanency.

The alkali metal salt or ammonium salt of the alkylaryl sulfonic acid is stable even in completely unneutralized phosphoric acid. Accordingly, the alkali metal salt or ammonium salt of the alkylaryl sulfonic acid is present in the diammonium phosphate granules and not as a mere coating on the granules. The above specified amounts of the alkali metal salt or ammonium salt of the alkylaryl sulfonic acid are to be incorporated in the granular diammonium phosphate. Accordingly, if any loss is found to occur, for example due to venting of the processing equipment, a corresponding adjustment should be made in the amount introduced into the processing equipment.

The form in which the alkali metal salt or ammonium salt of the alkylaryl sulfonic acid is introduced is not critical. It is found convenient to employ 1,2-dimethyl naphthalene sodium sulfonate, for example, as a powder or as an aqueous solution, for example, of 30 to 50 percent, by weight, concentration.

The aryl radical of the alkylaryl sulfonic acid or salt may be, for example, benzene, naphthalene and the like. The total number of carbon atoms in the one or more alkyl radicals on the aryl is not critical, though it is preferred that the number of carbon atoms be one to eighteen.

The methods of producing granular diammonium phosphate from phosphoric acid and ammonia to which the present invention is particularly applicable, involve the use of a granulator or an ammoniator-granulator, which, typically, may be a twin-shaft pugmill or blunger. Such methods are described, for example, at pp. 323–326 of "Superphosphate: Its History, Chemistry and Manufacture," issued December 1964 by the U.S. Department of Agriculture.

Aqueous phosphoric acid is fed to a saturator or neutralizer tank into which ammonia is also fed. By the reaction between the phosphoric acid and the ammonia diammonium phosphate forms. Because diammonium phosphate is relatively insoluble, it forms a slurry. The incompletely reacted slurry is fed to the granulator, in which the reaction continues and the particles of diammonium phosphate in the slurry buildup into granules. The slurry is dried to form the granular product and the granular product is screened. Undersized granules or fines are recycled to the granulator for further building up and oversized particles are crushed and also recycled for building up. A variant is to introduce only some of the ammonia into the neutralizer tank, in which instance it may be referred to as a "preneutralizer tank," and to introduce the balance of the ammonia into the granulator in which instance the granulator may be referred to as an "ammoniator-granulator." If desired, the proportion of ammonia introduced into the preneutralizer tank may be so small that the diammonium phosphate therein produced does not form a slurry and a slurry is only first formed in the ammoniator-granulator. Processes in which the diammonium phosphate first forms a slurry in the neutralizer or preneutralizer tank are commonly denoted "slurry processes," whereas those in which the diammonium phosphate first forms a slurry in the ammoniator-granulator are commonly denoted "nonslurry processes." Frequently, gypsum is slurried in the aqueous phosphoric acid fed to the neutralizer or preneutralizer tank, the purpose of the gypsum being to serve as a filler when grades of granular diammonium phosphate or granular diammonium phosphate-containing fertilizer requiring some dilution are being produced. However, the slurried gypsum has no bearing on the designation of the process as "slurry" or "nonslurry." Even when there is no ammonia introduction into the granulator, it is herein considered that there is simultaneous ammoniation and granulation since the reaction mixture is introduced into the granulator while the reaction is still proceeding.

A specific embodiment of the invention will now be described by reference to the drawing which is a flow sheet of the ammoniating stage of a process for the production granular diammonium phosphate.

Through a conduit 10 a 44 percent aqueous solution of phosphoric acid is fed to holding tanks 11. From holding tanks 11 this solution is fed through conduit 12 to a preneutralizer tank 13. Simultaneously with the foregoing, a slurry of gypsum in a 44 percent aqueous solution of phosphoric acid is fed through a conduit 14 to a holding tank 15 and therefrom through a conduit 16 to the preneutralizer tank 13, and ammonia vapor is fed through a conduit 17 to the preneutralizer tank 13 and to a blunger 20. Associated with the preneutralizer tank 13 is a leveling tank 19. A slurry of diammonium phosphate forms in the preneutralizer and leveling tanks and is maintained at a temperature of about 120° C. The slurry is fed from the leveling tank to the blunger wherein further reaction with ammonia and granulation take place. The slurry of granular diammonium phosphate thus formed is fed from the blunger 20 to a drier 21. The dry granular diammonium phosphate is then classified on a screen 22. The fines are fed to a recycle conveyor 24 and the oversized are fed to a crusher 25, and the crushed oversized are fed from the crusher 25 to the conveyor 24. The conveyor 24 carries the recycle diammonium phosphate to an elevator 26, which conveys this material to the blunger for building up.

During the process, a 50 percent aqueous solution of 1,2-dimethyl naphthalene sodium sulfonate is metered into the leveling tank at the rate of 1.5 pounds of the 1,2-dimethyl naphthalene sodium sulfonate per ton of the slurry in the leveling tank.

Various production samples are analyzed for 1,2-dimethyl naphthalene sodium sulfonate, subjected to 12 p.s.i. for seven days and the resulting cakes are tested for hardness. The granular diammonium phosphate is analyzed to determine the quantity of 1,2-dimethyl naphthalene sodium sulfonate present therein by a procedure based on the optical absorption of a complex of the methyl naphthalene sodium sulfonate and penacyanole blue into a non-aqueous phase; this procedure is similar to that described in Analytical Chemistry, 28, 870 (1955). Specifically, one-half gram of the diammonium phosphate is dissolved in 80 mls. of water; one ml. of 0.05% aqueous pinacyanole blue is added and then extracted with 10 mls. of monobromobenzene; the optical density of the extract is measured at 625 millimicrons and compared with a standard curve based on the same test of diammonium phosphate specimens containing known quantities of 1,2-dimethyl naphthalene sulfonate. The procedure employed for testing cake hardness is that described in commonly assigned copending application Ser. No. 608,717, filed Dec. 19, 1966, entitled Penetrometer and Method of Using Same. A control cake, made of granulated diammonium phosphate not containing 1,2-dimethyl naphthalene sodium sulfonate, is assigned a percentage of caking index of 100 percent. The test cakes are found to have a 1,2-dimethyl naphthalene sodium sulfonate content of about 0.04 percent, some having been lost in the process, and a percentage of caking index of about 30 to 50 percent.

Rather than being fed directly into the reaction mixture, the alkylaryl sulfonic acid or alkali metal salt thereof may be fed into one of the other feeds to the reaction mixture. Thus for example, the 1,2-dimethyl naphthalene sodium sulfonate may be fed into the phosphoric acid holding tanks 11 or, as an aqueous solution, into the suction side of a pump (not shown) in the conduit 12.

The invention is also applicable to the production of granular diammonium phosphate alone or in admixture with materials other than, or in addition to, gypsum, for example, potassium chloride, this particular mixture being known as a "mixed fertilizer."

While the invention has been described by reference to particular embodiments thereof, it is to be understood that the invention includes all modifications and variations within the scope of the appended claims.

Having thus described certain forms of the invention in some detail, what is claimed is:

1. In a method of producing diammonium phosphate including the steps of simultaneously reacting phosphoric acid with ammonia, forming a slurry and granulating said reacting mixture, the improvement of introducing into the reacting mixture a compound selected from a group consisting of ammonium and alkali metal salts of a benzene alkyl aryl sulfonic acid, and ammonium and alkali metal salts of a naphthalene alkyl aryl sulfonic acid, wherein said alkyl group has one to eighteen carbon atoms, such that the diammonium phosphate thereby formed integrally contains between 0.005 and about 0.3 percent by weight of said compound, whereby the thusly produced diammonium phosphate has a substantially less tendency to cake.

2. In a method according to claim 1, in which the amount by weight of said compound introduced into said reaction mixture is such that the diammonium phosphate produced contains no more than about 0.05 percent by weight of said compound.

3. In a method according to claim 1, in which said compound is 1,2-dimethyl naphthalene sodium sulfonate.

References Cited

UNITED STATES PATENTS 2,905,532   9/1959   Thompson _____ 23—119
3,325,276   6/1967   Feller _____ 71—64

OSCAR R. VERTIZ, Primary Examiner

HOKE S. MILLER, Assistant Examiner

U.S. Cl. X.R.

23—119; 71—64; 232—381, 383, 385